H. D. FARQUHAR.
CAMERA DEVICE.
APPLICATION FILED FEB. 8, 1916.

1,278,896.

Patented Sept. 17, 1918.
7 SHEETS—SHEET 1.

Witnesses:
Gustav Genzlinger
L. Gifford Handle

Inventor
Harry D. Farquhar
By his Attorney
Charles H. Wilson

H. D. FARQUHAR.
CAMERA DEVICE.
APPLICATION FILED FEB. 8, 1916.

1,278,896.

Patented Sept. 17, 1918.
7 SHEETS—SHEET 5.

H. D. FARQUHAR.
CAMERA DEVICE.
APPLICATION FILED FEB. 8, 1916.

1,278,896.

Patented Sept. 17, 1918.
7 SHEETS—SHEET 6.

Witnesses:

Inventor
Harry D Farquhar
By his Attorney
Charles H Wilson

H. D. FARQUHAR.
CAMERA DEVICE.
APPLICATION FILED FEB. 8, 1916.

1,278,896.

Patented Sept. 17, 1918.
7 SHEETS—SHEET 7.

UNITED STATES PATENT OFFICE.

HARRY D. FARQUHAR, OF NEW YORK, N. Y.

CAMERA DEVICE.

1,278,896.	Specification of Letters Patent.	Patented Sept. 17, 1918.

Application filed February 8, 1916. Serial No. 76,894.

*To all whom it may concern:*

Be it known that I, HARRY D. FARQUHAR, residing at New York, in the county of New York and State of New York, have invented certain new and useful Improvements in Camera Devices, of which the following is a specification.

This invention relates to a camera and the object thereof is to provide a thoroughly practical and highly efficient camera device, particularly adapted for use in copying and half tone work and the like. The invention includes improved means for effecting the several necessary adjustments of the parts of the camera proper, improved means for retaining the plate or the like in position within the camera, improved means for retaining the screen, which is used particularly in half tone work, together with an improved carriage for the camera proper and an improved form of support for the object to be photographed.

Other objects and aims of the invention more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention.

Referring to the drawings for a detailed description of the structure illustrated, the reference character L indicates the carriage. This comprises a main carriage structure formed of a bar 1 having brackets 2 arranged one at each end thereof, said brackets being fitted with suitable casters 3 by means of which the carriage is rendered readily mobile. The brackets 2 each carry a pair of elliptical springs 4, the springs having their lower members connected to the brackets in each instance. A secondary carriage structure is mounted upon the upper members of the springs and this secondary structure comprises a pair of rods 5, mounted directly upon the upper members of the springs, and a pair of rods 6 which are connected with the rods 5 by means of suitable brackets 7 at intervals along the length of said rods. The brackets 7 connect the rods 5 and 6 rigidly together and the secondary structure thus formed is resiliently supported upon the spring. All of the rods 1, 5 and 6, are arranged in parallel relation to each other and the rods 5 constitute a runway along which the camera proper is adapted to travel.

The reference character G indicates the object holder. This is constructed along the lines of that shown in my copending application, Serial Number 50,755, filed Sept. 15, 1915, and includes certain improvements which will be described.

A pair of uprights 8 is mounted upon the rods 5 and a tubular member 9 extends between the upper ends thereof. The object carrying frame 10 carries a pair of hook-like bearing members 10 on its rear surface for engaging over the tube 9 whereby to pivotally support the object carrying frame upon the tube 9. When the object carrying frame is in normal vertical position the lower end thereof rests against a cam 11 which is rotatably mounted upon a tube 12 carried by the uprights 8. The exact position of the object carrying frame may be readily adjusted with regard to the vertical plane by simply rotating the cam about the tube 12. Any suitable means, as for instance the set screw 13 may be employed for retaining the cam in an adjusted position.

Figures 20, 21:
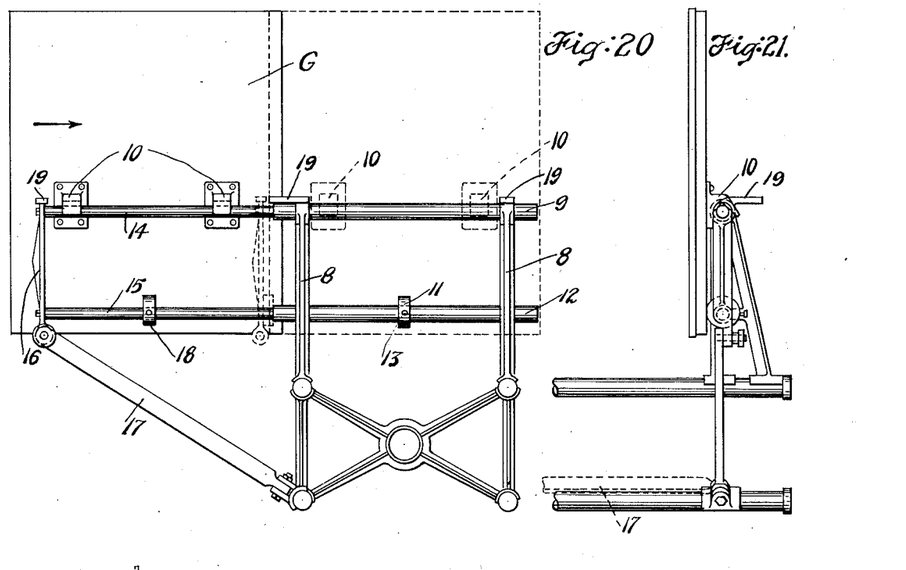
Fig. 20 is an elevational view of the object supporting device and showing the manner of connecting the same with the carriage.
Fig. 21 is a side elevational view of the part shown in Fig. 20.

A pair of rods 14 and 15 are mounted to telescope within the tubes 9 and 12. The outer ends of these rods are preferably connected together by a member as 16. When the rods 14 and 15 are telescoped outwardly from the tubes 9 and 12, the outer ends thereof are supported by means of a detachable brace 17 extending from the member 16 diagonally downward to one of the rods 6. When not in use this brace may be collapsed against the side of the rod 6 as shown by the dotted lines in Fig. 21. The rod 14 in its outer position constitutes an independent support for the object carrying member entirely at one side of the plane of the longitudinal central axis of the carriage L. The object carrying member may be readily lifted from supported relation upon the tube 9 and placed instead upon the rod 14. The bearing members 10 will engage the rod in precisely the same manner as they have previously engaged the tube 9. The rod 15 is fitted with an adjustable cam 18 similar to the cam 13.

In either of its positions the object carrying frame may be swung to the horizontal plane and will be supported in the horizontal plane by means of the shoulders 19 which are formed upon the uprights 8 and upon the member 16.

Figure 22:
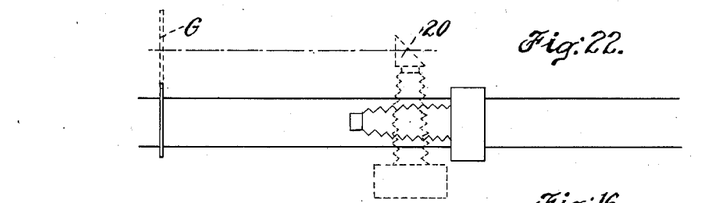
Fig. 22 is a diagrammatic view illustrating particularly the manner of utilizing the parts shown in Fig. 20.

The purpose of providing a support for the frame G at one side of the carriage is well known in the art, but is illustrated diagrammatically in Fig. 22, wherein it is seen that when the frame G is at one side, as illustrated by the dotted lines, the same stands in line with the prism or the like as 20, which is employed in the camera at certain times. At these times the camera is rotated into a position transverse of the carriage L also as shown by the dotted lines in the Fig. 22.

The reference character H indicates the camera proper. This comprises generally the bed 21, box 22, front standards 23, and the bellows 24.

The bed shown rests upon a carriage 25 which is fitted with suitable rollers 26 mounted to travel upon the rods 5. This carriage supports a turn table 27, the lower member of which is rigid with the carriage and the upper member of which is rigid with the camera bed. A bolt 27 connects the upper and lower members together so as to retain them in coöperative position. A pair of adjustable stops 28 is provided upon the lower member and a lug 29 on the upper member plays therebetween so as to limit rotary movement of the camera bed within approximately an arc of 90 degrees. In one of its extremes the camera bed is in alinement with the carriage L, while in the other extreme it is at right angles to the camera bed (see Fig. 22).

The bed comprises a pair of longitudinally extending side members 30 connected at their ends by cross members 31. The upper member of the turn table is connected to the intermediate portion of the side members as by means of lugs 32 to which the upper member of the turn table is directly bolted. A pair of track members 33 is supported from the members 30 by means of being attached at intervals to ears 34 formed upon the members 30.

The track members are connected to the ears by means of bolts 35 which are fixed rigidly to the track members and extend loosely through openings formed in the ears 34. The bolts are threaded and fitted with suitable lock nuts 36 at opposite sides of the ears by means of which the track members 33 may be readily adjusted in a horizontal plane. The bolts serve to hold the track members rigidly in any adjusted position at all times.

Figure 1:
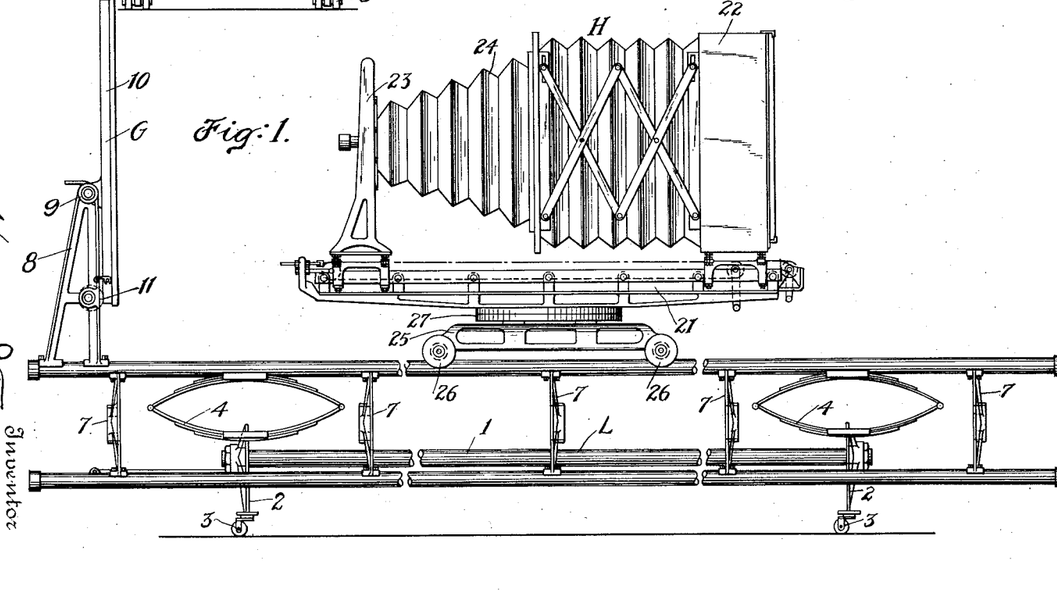
Figure 1 is a side elevational view of a camera device constructed in accordance with the provisions of this invention.
Figure 2:
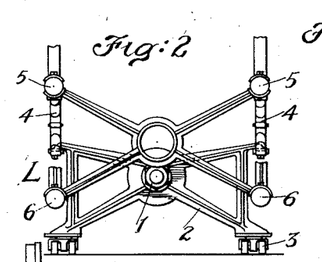
Fig. 2 is an end elevational view of the carriage illustrated in Fig. 1.
Figure 3:
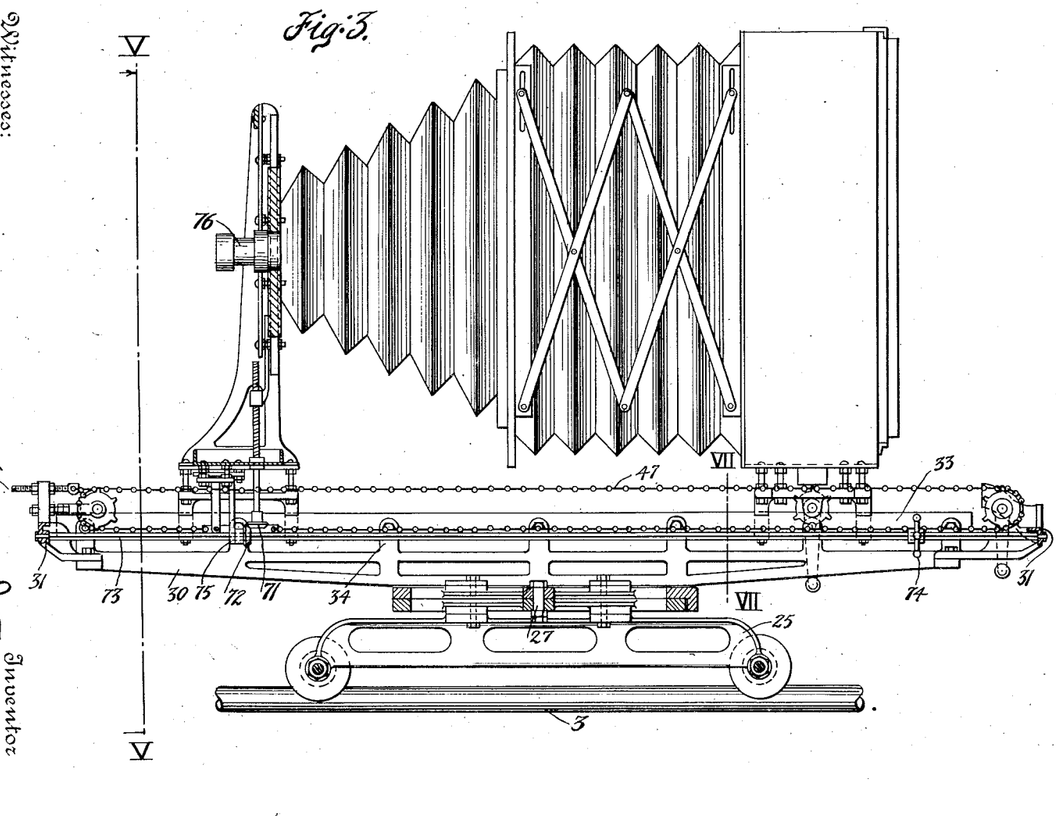
Fig. 3 is an enlarged side elevational view of the camera proper, the parts being shown in vertical section for more clearly illustrating a construction thereof, the section being taken substantially upon the plane of line III—III of Fig. 5.
Figures 4, 8, 9:
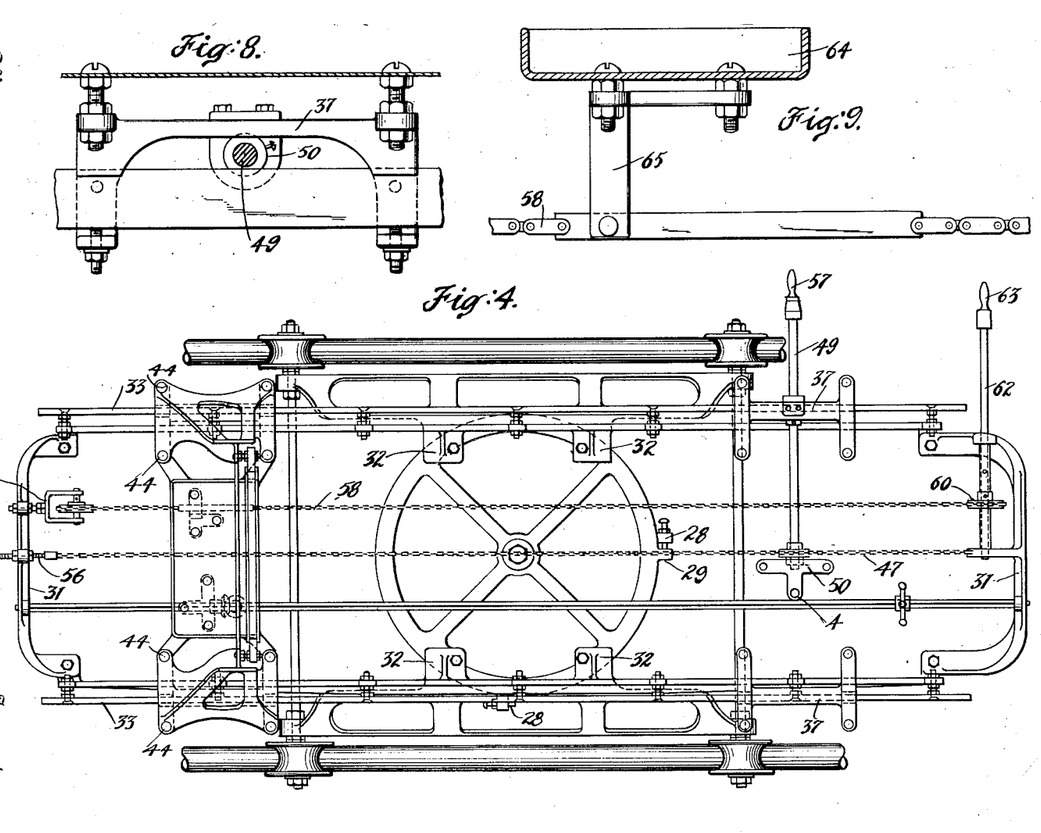
Fig. 4 is a top plan view of the camera bed.
Fig. 8 is a fragmentary sectional view on line VIII—VIII of Fig. 7.
Fig. 9 is a fragmentary detail sectional view taken substantially upon the plane of line IX—IX of Fig. 5.
Figures 5, 6:
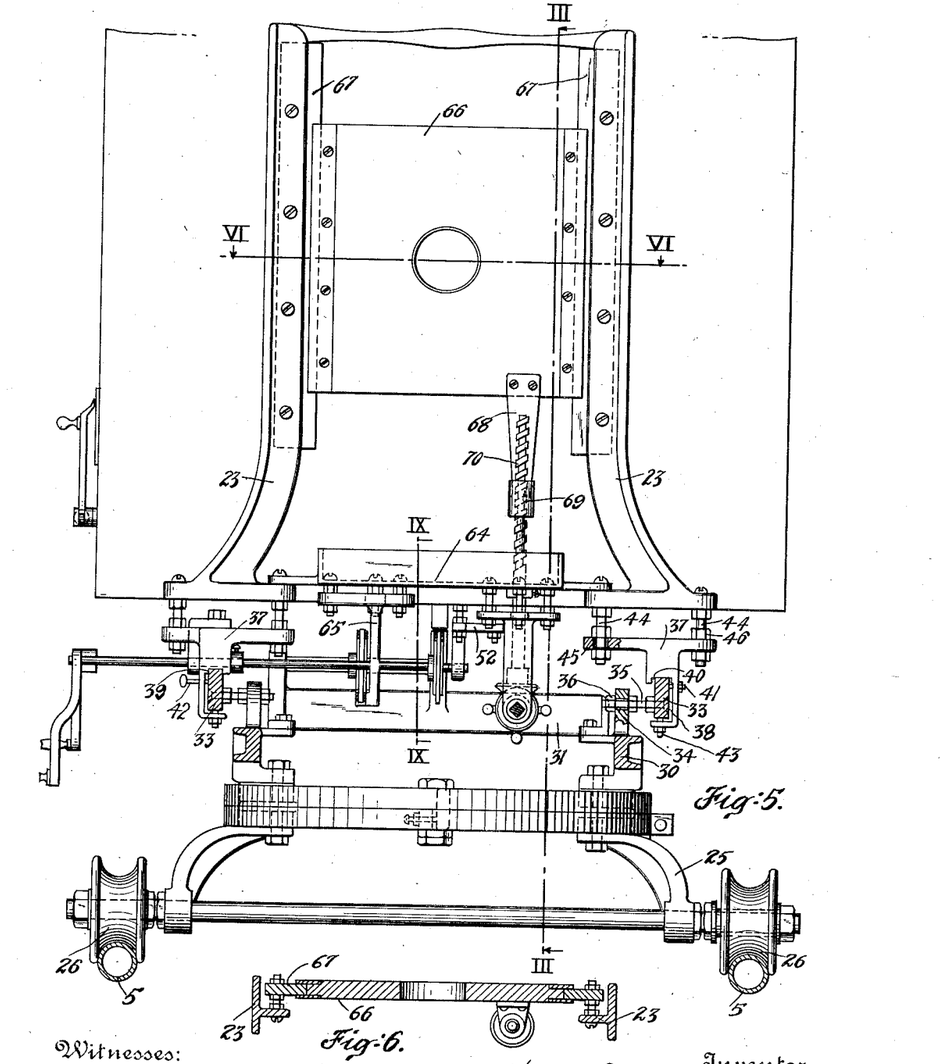
Fig. 5 is a vertical sectional view taken upon the plane of line V—V of Fig. 3, said view being further enlarged.
Fig. 6 is a horizontal sectional detail view taken upon the plane of line VI—VI of Fig. 5.
Figure 7:
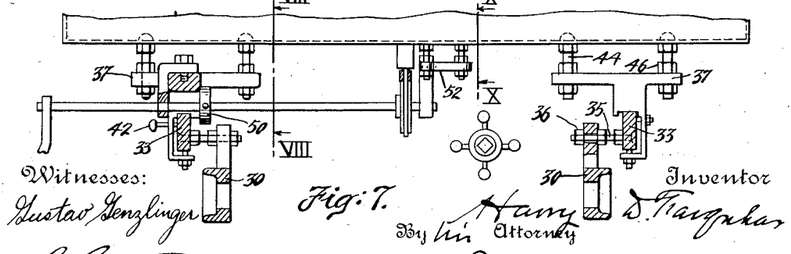
Fig. 7 is a fragmentary sectional view taken substantially upon the plane of line VII—VII of Fig. 3.

The box 22 and the front standard 23 are slidably mounted upon the track members 33, the manner of mounting the box and the front standard upon the track members being identical in each case and being best seen by reference to Figs. 6, 7 and 8. In these figures it will be seen that castings 37 are formed with recesses 38 which fit loosely over the track members. The castings which engage one of the track members are provided with a groove 39 which closely fits the upper edge of said track member, whereas the castings which engage the opposite track member are fitted with a groove 40 which is wider than the respective track member. In the latter instance, however, a set screw 41 is provided, said set screw being adapted to be adjusted so as to prevent any lost motion. A set screw, as 42, may be provided in the first mentioned castings if desired, in order to compensate for wear of the walls of the grooves 39. In all of the castings set screws 43 are provided, these last being arranged beneath the track members and being adjusted for avoiding all unnecessary lost motion between the parts.

By this arrangement ample adjustments of all of the parts concerned is provided for and incidentally it has been unnecessary to provide machine finished surfaces upon any parts excepting the castings 37 and the track members 33. Since the track members are rectangular through their length it is possible to employ ordinary rolled metallic bars in them so as to avoid necessity for machine work if desired.

It may be here stated that all of the parts of this device, both of the camera proper, the main and secondary carriages, etc., are preferably made of metal (with the exception of course of the lens, lens board and bellows) to the end that all possible shrinking and warping of parts will be avoided. The likelihood of such shrinking and warping producing a change of focus or derangement of some other necessary accurate adjustment of parts is overcome.

As a convenient means for positively locking the box 22 at any adjusted position along the length of the track members 33, one or both of the set screws 42 may be employed as a clamp screw for gripping the track member. When the box has been adjusted to a desired position said screw or screws may be rotated by the operator into tight contact with the track member and further movement of the box will be prevented until the screw or screws have been released.

The box 22 and the front standard 23 are mounted upon the castings 37 in a manner which provides for all necessary adjustment and which also avoids the necessity for machine finishing. This connecting means includes a plurality of bolts 44 which are fixed rigidly to the box and to the front plate and extend downwardly from said members into engagement with ears 45 formed upon the castings 37, said ears being provided with smooth apertures through which the bolts extend. The bolts are threaded and suitable nuts as 46 are provided thereon for adjustment of the box and front standard. The nuts serve to hold the box and front standard fixedly in any adjusted position relatively to the castings. Any number of bolts may be employed in connection with each of the castings 37, but four such bolts are employed in the structure illustrated. In order to move the box 22 at will along the track members 33 a sprocket chain 47 is arranged longitudinally of the bed and a sprocket wheel 48 is rotatably connected with the box 22 and disposed so as to crawl along the chain 47. The sprocket wheel 48 may be supported in any suitable manner, but is preferably carried upon a shaft 49 which extends through a bearing 50, formed in one of the castings 37, and through a bearing 51 provided in a bracket 52 supported from the under side wall 53 of the camera box. The bracket 52 is mounted so as to be vertically adjustable upon a plurality of bolts 54 which extend downwardly from the bottom wall 53. By this means the shaft 49 and sprocket wheel 48 may be adjusted with respect to a guide block 55 which is fixed to the bottom wall 53 and which travels directly over the upper surface of the chain 47 in the plane of the wheel 48 so as to prevent the chain becoming detached from the teeth of the wheel 48.

The opposite ends of the chain 47 are connected to the opposite end members 31 of the bed and an adjustable take-up device 56 is provided whereby the chain may be maintained taut. A suitable handle 57 is provided upon the outer end of the shaft 49 for rotating the same.

In order to move the front standard at will along the track members 33 an endless sprocket chain 58 is provided, said chain being carried upon sprocket wheels 59 and 60 rotatably mounted in the opposite end members 31 of the bed. The sprocket wheel 59 is mounted in an adjustable take-up device 61, through the medium of which the chain 58 may be maintained taut. The sprocket wheel 60 is mounted upon a shaft 62 which is provided with a suitable handle 63 by means of which the chain may be caused to move.

The front standard is provided with a base member 64 to the bottom surface of which a bracket 65 is secured. This bracket extends downwardly and is connected to the lower lead of the chain 58 so that longitudinal movement of said lower lead will be imparted directly to the base member of the front standard and will thereby cause the whole front standard structure to travel with said lower lead. The bracket 65 is preferably made adjustable with respect to the base member in the same manner as heretofore described with respect to the bracket 52.

The front board 66 is mounted to be vertically adjustable between the front standards. In the structure illustrated the front standards are provided with oppositely disposed guide members 67, each preferably connected to the standards so as to be adjustable for determining the position of the front board to a nicety with regard to the vertical plane.

In order to move the front board vertically between the guide members 67, a bracket 68 is connected thereto having a threaded aperture 69 through which a screw 70 rotatably extends. The screw 70 is arranged in a vertical position and engages the part 69 by its upper portion. At the lower end of the screw a beveled gear 71 is arranged so as to mesh with a beveled gear 72 slidably mounted upon a shaft 73. The shaft 73 extends longitudinally of the bed and is rotatably mounted in the opposite end members 31. A hand wheel 74 is mounted upon the shaft 73 and has a squared opening therethrough whereby the shaft may be readily rotated. The hand wheel 74 is readily movable longitudinally of the shaft for the convenience of the operator. The gear 72 is maintained in proper position relatively to the gear 71 by means of a bracket 75 which is connected to the base member 64 of the front standards and extends downwardly therefrom into a position behind the gear 72.

By this means rotation of the hand wheel 74 will cause the front board of the camera, together with the lens 76 carried thereby, to move vertically at the will of the operator, irrespective of the position of the front standards longitudinally of the track members 33.

The bellows 24 may be of any approved or preferred type and extends between the box 22 and the front standards in the customary manner.

The camera box 22 is fitted with a pair of guide members 77 arranged vertically therein adjacent the opposite sides thereof. A pair of horizontally disposed members 78 and 79 are adjustably connected to the members 77 so as to be readily movable vertically thereof.

Figures 11, 12, 13, 14, 23:
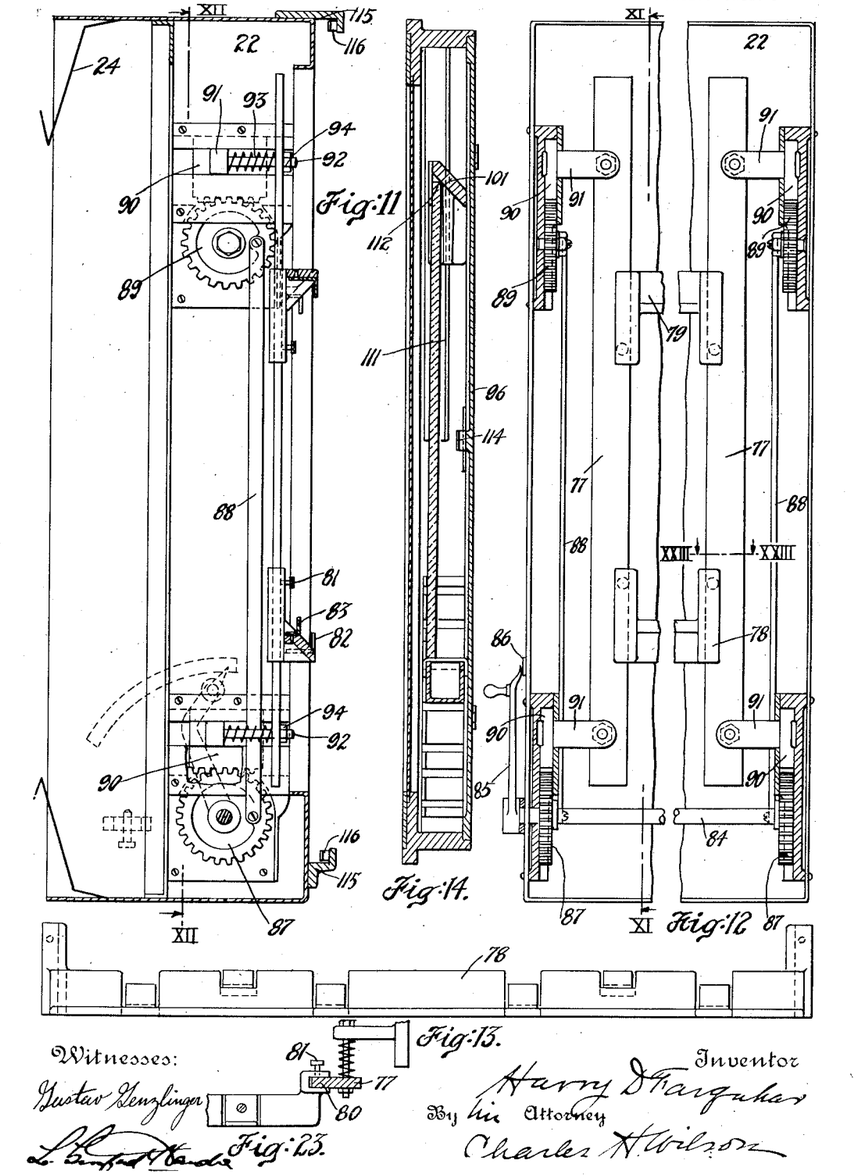
Fig. 11 is a vertical sectional view through the camera box, the section being taken upon the plane of line XI—XI of Fig. 12.
Fig. 12 is an elevational view of the camera box, the central portion being broken away for the saving of space, and parts being illustrated in section upon the plane of line XII—XII of Fig. 11.
Fig. 13 is a detail elevational view of one of the adjustable supporting devices employed within the camera box for supporting the screen.
Fig. 14 is a vertical sectional view through the plate-holder employed, said section being taken substantially upon the plane of line XIV—XIV of Fig. 15.
Fig. 23 is a detail sectional view taken upon the plane of line XXIII—XXIII of Fig. 12.
Figure 15:
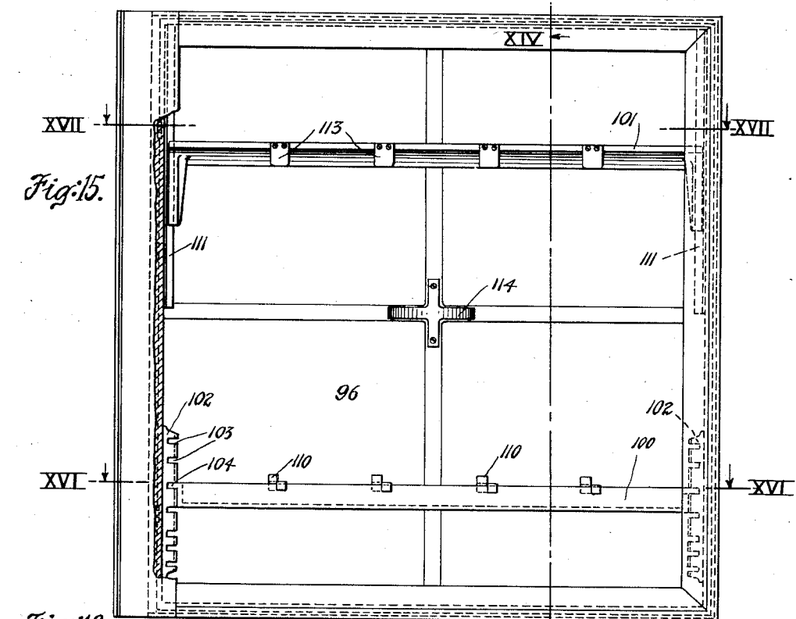
Fig. 15 is an elevational view of the plate-holder, showing the slide removed so as to disclose the interior construction.
Figure 16:
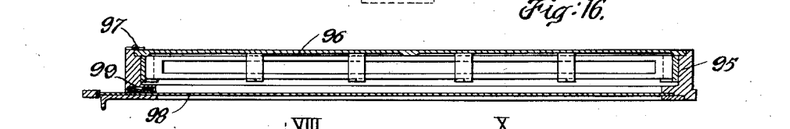
Fig. 16 is a horizontal sectional view through the plate-holder, said section being taken upon the plane of line XVI—XVI of Fig. 15.

The supporting members 78 and 79 extend from one of the guide members 77 to the other and are formed with grooves 80 at opposite ends thereof straddling the guides 77. Suitable set screws 81 are provided for engaging the guides to retain the members 78 and 79 in any adjusted vertical position. The supporting members 78 and 79 serve to support the screen and they are substantially identical, except that they are arranged in reverse positions. Each is provided with a series of clips 82 and 83 which engage the screen to hold the same in position. The clips upon the member 78 extend upwardly while those upon the member 79 extend downwardly, as is best seen in Fig. 11. Means is thus provided for receiving and retaining either a square or a circular screen according as requirements may dictate.

The guide members 77 are mounted so as to be readily adjustable for moving the screen carrying members toward or away from the rear end of the box. In order to make this adjustment easy and uniform a parallel-motion device is provided which includes a shaft 84 extending from one side of the box to the other and provided with an operating handle 85 exteriorly of the box at one end thereof. A suitable scale 86 is arranged to coöperate with the handle for indicating the degree of movement desired. A pair of gears 87 is arranged upon the shaft 84 within the box adjacent the opposite vertical walls thereof and said gears are connected by links 88 with other gears 89 arranged adjacent the upper end of the guide members 77. The links 88 serve to impart exactly the same movement to the gears 89 as is imparted to the gears 87 directly by means of the handle 85. Each of the gears 87 and 89 is disposed to operate a slide 90. The slides 90 which are operated by the gears 89 are connected to the upper ends of the guide members 77, while the guides which are operated by the gears 87 are connected to the lower ends of the guide members 77. By this means movement of the handle 85 will cause the guide members 77 to move in parallelism at all times.

The guide members 77 are preferably connected to the several slides 90 so as to be independently adjustable relatively to the respective slides. In order to effect this adjustable connection, each of the slides is provided with an ear 91 carrying a stud 92. The guide members are formed with apertures which fit loosely over these studs and against coil springs 93 which encircle the studs. Suitable nuts or the like 94 engage the projecting ends of the studs to press the same into any desired position against the tension of the springs.

The plate-holder employed in connection with this device is also of metal and comprises a rectangular frame 95 having its rear wall formed as a door 96 which is pivotally connected to the frame 95 as by means of hinges 97. The front wall of the holder consists of a removable slide 98 such as is usual in plate-holders. A suitable light excluding mechanism 99 is employed for preventing the entrance of light when the slide is withdrawn.

A cross member 100 is provided within the holder at the lower portion thereof for supporting the plate, while a cross member 101 is provided within the holder at the upper portion thereof for engaging the upper edge of the plate to retain the plate in a proper vertical position. Each of these cross members is mounted within the holder so as to be vertically adjustable. A pair of members 102 is provided at the lower portion of the holder, one at each side thereof for supporting the cross member 100. These members 102 are each provided with a series of grooves or pockets 103 into any selected pair of which extensions 104, from the ends of the cross member 101, may be engaged. The members 102 are formed with stops 105 against which the forward surface portions 106 of the members 100 engage to limit the forward movement of the members 101. These stops serve, with the door 96, to hold the members 100 in fixed position so long as the door is maintained closed.

Figures 10, 19:
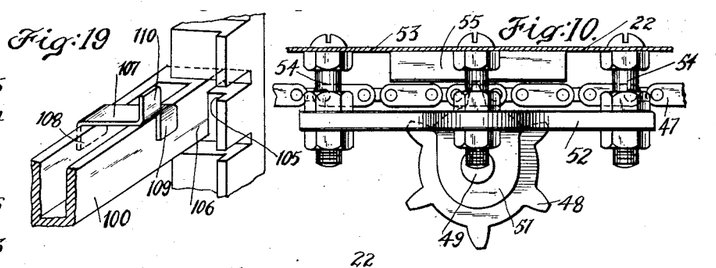
Fig. 10 is an enlarged detail sectional view taken upon the plane of line X—X of Fig. 7.
Fig. 19 is a fragmentary detail view showing the construction of a portion of the plate-holder.

A plurality of clips 107 is arranged upon the cross member 100, said clips being detachable and readily adjustable into any position longitudinally of the cross member. These clips serve to directly support the plate and their adjustability renders them capable of supporting plates of any size, as may be readily understood. The cross member 100 is preferably formed of channel-shape and is disposed so as to open outwardly, the ends of the channel being closed so as to constitute the same as a drip pan for catching any liquid, acids or the like, which may flow from the plate. As best seen in Fig. 19, the clips straddle the upper ends of the side walls of the cross member and support the plate directly above the space between said side walls.

The precise form of the clip may be varied, but it is preferably formed from a single piece of metal having its opposite end portions turned downwardly as at 108 and 109. These portions are preferably resilient so as to frictionally engage the outer surface of the side walls of the cross member to retain the clip against accidental displacement. A finger 110 is turned upwardly adjacent one end so as to constitute a stop against which the plate may rest. This stop is preferably arranged at the end nearest the slide 98 so that the plate may be readily slipped into the holder and upon the clips from the rear when the door 96 is opened.

The cross member 101 has its opposite ends engaged with a pair of guides 111 carried by the opposite side walls of the frame. This cross member may thus be readily moved upwardly or downwardly according to the size of the plate to be engaged thereby. An inverted V-shaped groove 112 is provided in the cross member 101 so as to engage over the upper end of the plate in the manner clearly indicated in Fig. 14. This groove is preferably provided by disposing the under surface of the intermediate portion of the member at an incline upwardly and rearwardly and by providing a series of downwardly projecting fingers 113 at the upper end of this surface. By this means the plate is automatically urged into a predetermined position by the downward movement of the cross member upon the upper edge of the plate. The engagement of the opposite ends of the member 101 with the guides 111 preferably produces sufficient friction so as to retain this cross member in any position to which it is manually moved, but this is not essential as it is apparent that other means might be employed to retain the member in any adjusted position and that the weight of the cross member might be employed to urge the plate into predetermined position.

In any event it is desirable that a spring 114 be provided, preferably upon the inner surface of the door 96 for engaging the rear surface of the plate to press it positively toward the fingers 110 and 113.

The rear side of the camera box 22 is provided with suitable guide ways 115 for receiving the plate-holder, said guide ways being provided with the usual springs 116 for engaging against the plate-holder to press the same at all times into light tight engagement with the rear surface of the box.

Practically all of the parts of the plate holder are of non-corrosive metal so that said holder may be used in connection with the wet plate process and at the same time be immune to the attacks of moisture and chemicals which may be carried thereinto by the wet plates.

Figures 17, 18:
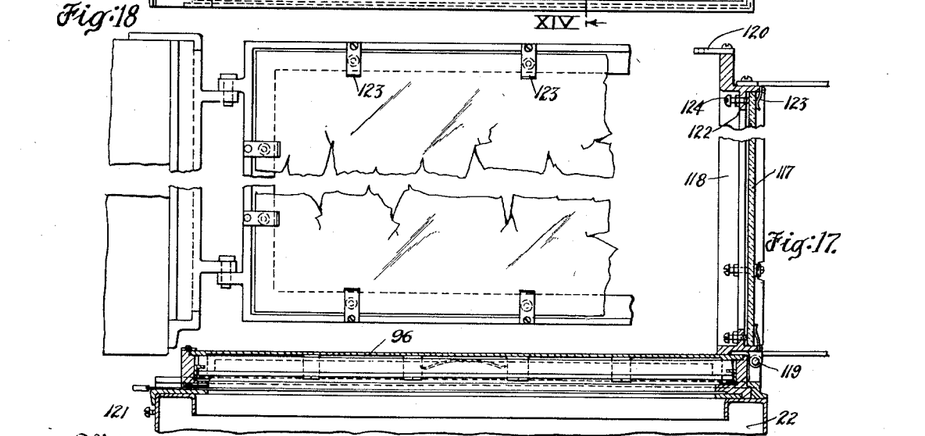
Fig. 17 is a horizontal sectional view through the plate-holder, taken upon the plane of line XVII—XVII of Fig. 15, showing said plate-holder in position upon the rear of the camera box, the ground glass carrying frame of the camera box being thrown open to receive the plate-holder.
Fig. 18 is an elevational view, partly broken away, of the ground glass carrying frame and its manner of connection with the camera box.

The usual ground glass 117 is provided for use in focusing the camera. As illustrated, this ground glass is carried in a door 118 which is pivotally connected, as at 119 at the rear of the box 22. A latch 120 is provided at the free edge of the door for engaging a pin 121 on the box to retain the door closed when the plate-holder is not in position. In order to slide the plate-holder into position along the guide ways 115, as shown in Fig. 17, the door 118 is swung open as indicated.

The manner of retaining the ground glass in the door frame includes a web 122 formed upon the door frame toward which the glass is urged by a series of small leaf springs 123. A series of set screws 124 extend through the web 122 and into engagement with the glass so as to press the glass toward the springs. By this means the glass may be readily adjusted as desired, and at the same time a fastening means is provided which is not likely to injure the glass in any way.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:

1. A camera carriage, comprising a main structure and an auxiliary structure, the main structure consisting of a pair of brackets, a single central rod extending between and rigidly connecting said brackets together, casters carried by said brackets, and springs also carried by said brackets, and the secondary structure engaging said springs whereby to be resiliently supported from the main structure.

2. In a camera carriage, means forming a runway along which the camera may travel, supporting means disposed in line with said runway for supporting the object to be photographed, and means whereby said supporting means is adjustable into a position entirely out of the path of said runway.

3. In a camera carriage, means forming a runway along which the camera may travel, supporting means disposed in line with said runway for supporting the object to be photographed, a bracket for said supporting means, and an adjustable part comprised in said bracket adjustable to form an extension of said bracket entirely out of the path of said runway upon which said supporting means may be supported.

4. In a camera carriage, means forming a runway along which the camera may travel, supporting means disposed in line with said runway for supporting the object to be photographed, a bracket for said supporting means comprising a tubular member upon which said supporting means rest, and a rod telescopically slidable within said tubular member adjustable to comprise an extension from one end of the tubular member out of alinement with said runway upon which the supporting member may rest when desired.

5. Means for supporting an object to be photographed, comprising a member pivoted to swing in a vertical plane, a support for said member, bearing parts for said member by means of which the member is detachably pivotally connected to said support, and said support having a plurality of localities where said bearing parts may be pivotally engaged.

6. Means for supporting an object to be photographed, comprising a member pivoted to swing in a vertical plane, a support for said member, bearing parts for said member by means of which the member is detachably pivotally connected to said support, said support having a plurality of localities where said bearing parts may be pivotally engaged, and an adjustable member comprising at least one of said mentioned localities, whereby the same may be moved to an out-of-the way position when not in use.

7. In a camera, the combination comprising a bed, a carriage therefor, a substantially straight runway for the carriage, a turn table between the bed and the carriage, whereby the camera bed may be rotated with respect to said runway, and stops for limiting the rotary movement of the bed relatively to the carriage.

8. In a camera, the combination comprising a bed, a box movable along the bed, a sprocket chain extending longitudinally of the bed, means for moving said sprocket chain longitudinally of the bed, and means carried by the box for engaging the sprocket chain to cause the box to travel longitudinally of the bed.

9. In a camera, the combination comprising a bed, front standards movable along the bed, an endless chain extending longitudinally of the bed, means connecting said front standards with one lead of said chain, and means for moving said chain to cause the front standards to travel along the bed.

10. In a camera, the combination comprising a bed, front standards carried thereby, a front board vertically adjustable between said standards, a vertically disposed screw for adjusting said front board, a beveled gear carried by said screw, a rod extending longitudinally of the bed, means whereby said rod may be manually rotated, and a beveled gear carried by said rod engaging said first mentioned beveled gear, whereby to adjust the front board vertically between said standards.

11. In a camera, the combination comprising a bed, front standards, means for moving said front standards longitudinally of said bed, a front board vertically adjustable between said standards, a rod extending longitudinally of said bed, means for rotating said rod, and means movable with said standards engaging said rod whereby said front board may be vertically adjusted irrespective of the position of said standards.

12. In a camera, the combination comprising a bed, front standards, means for moving said front standards longitudinally of said bed, a front board vertically adjustable between said standards, a rod extending longitudinally of said bed, means movable with said standards engaging said rod whereby said front board may be vertically adjusted irrespective of the position of said standards, and a hand wheel carried by said rod for rotating said rod, said hand wheel being freely movable longitudinally of said rod.

13. A camera bed, comprising side members and end members, a pair of track members, and means for supporting the track members from the side members comprising bolts extending from the track members into adjustable connection with the side members.

14. In a camera box, means for holding a screen therein, a parallel-motion device whereby the screen may be moved forwardly and backwardly, said parallel-motion device including a pair of spaced upright members and a pair of spaced cross members extending between the upright members and serving to engage the screen, a plurality of slides one engaging each of the opposite ends of the upright member to support the upright member, and means for simultaneously and uniformly moving all of said slides.

15. In a camera box, means for holding a screen therein, and a parallel-motion device whereby the screen may be moved forwardly and backwardly, said parallel-motion device including a pair of spaced upright members and a pair of spaced cross members extending between the upright members and serving to engage the screen, a plurality of slides one engaging each of the opposite ends of the upright members to support the upright members, rotatable members engaging the two lowermost slides, means extending between said rotatable members to rotate the same together, rotatable members for moving the two uppermost slides, and means extending between said first rotatable members and said second rotatable members to cause all of said rotatable members to rotate in unison whereby to simultaneously and uniformly move all of said slides.

16. In a camera box, means for holding a screen therein, a parallel-motion device whereby the screen may be moved forwardly and backwardly, said parallel-motion device including a pair of spaced upright members and a pair of spaced cross members extending between the upright members and serving to engage the screen, a plurality of slides one engaging each of the opposite ends of the upright members to support the upright members, means for simultaneously and uniformly moving all of said slides, and means whereby said upright members are adjustably connected to said slides independently.

17. In a camera bed, a track member comprised in said bed, a slidable member movable along the track member having parts slidably engaging the track member, and means whereby said last mentioned parts are adjustable to provide a desired fit with respect to the track member.

18. In a camera bed, a track member comprised in said bed, a slidable member movable along the track member having a part slidably engaging the track member, and means carried by said mentioned part adjustable to lock said slidable means against sliding when desired.

19. In a camera bed, a track member comprised in said bed, a slidable member resting upon the upper surface of said track member to slide therealong and having a part extending to a position beneath the track member, and adjustable means carried by said mentioned part adjustable toward and away from the under surface of said track member whereby to adjust the fit of the slidable member upon said track member.

20. In a metallic carriage construction for cameras, the combination with a camera having a wheeled bed, of a carriage comprising a main structure and an auxiliary structure, the auxiliary structure including a pair of substantially cylindrical rods, means whereby said mentioned rods are resiliently supported upon the main structure, a plurality of brackets extending between and connecting said mentioned rods to retain the same rigid with respect to each other and in substantially parallel relation so as to constitute a track along the upper surface of which the wheels of the wheeled camera bed may travel.

21. A metallic carriage for cameras or the like, comprising a pair of substantially cylindrical track members spaced apart adapted to receive and movably support the camera, and brackets extending between said track member having concaved seats therein within which said track members engage.

22. A metallic carriage for cameras or the like, comprising a plurality of substantially cylindrical tubular metallic track members adapted to be engaged by the wheels of a wheeled camera bed, to movably support the camera bed, and means for connecting said track members rigidly together.

23. A metallic carriage for cameras or the like, comprising a plurality of substantially cylindrical tubular metallic track members adapted to be engaged by the wheels of a wheeled camera bed, to movably support the camera bed, means for connecting said track members rigidly together, and means for resiliently supporting said track members.

24. A metallic carriage for cameras or the like, comprising a plurality of substantially cylindrical tubular metallic track members adapted to be engaged by the wheels of a wheeled camera bed, to movably support the camera bed, means for connecting said track members rigidly together, and a wheeled supporting device upon which said track members are resiliently mounted.

25. A metallic carriage for cameras or the like, comprising a plurality of substantially cylindrical tubular metallic track members adapted to be engaged by the wheels of a wheeled camera bed, to movably support the camera bed, means for connecting said track members rigidly together, and a supporting device upon which said track members are mounted comprising a pair of brackets spaced apart, and a single connecting rod extending substantially parallel to said track members and rigidly connecting said brackets together.

26. A metallic carriage for cameras or the like, comprising a plurality of substantially cylindrical tubular metallic track members adapted to be engaged by the wheels of a wheeled camera bed, to movably support the camera bed, means for connecting said track members rigidly together, a supporting device upon which said track members are mounted comprising a pair of brackets spaced apart, and a single connecting rod extending substantially parallel to said track members and rigidly connecting said brackets together, and means whereby the track members are resiliently connected to said brackets.

27. A carriage for cameras or the like, comprising a pair of track members, and a supporting device for said track members which supporting device comprises a pair of brackets arranged one adjacent each end of said track members, and means for resiliently connecting said brackets to the adjacent ends of said track members.

28. A carriage for cameras or the like, comprising a pair of track members, and a supporting device for said track members which supporting device comprises a pair of brackets arranged one adjacent each end of said track members, means for resiliently connecting said brackets to the adjacent ends of said track members, and a single connecting rod extending between said brackets rigidly connected thereto for retaining said brackets rigid with respect to each other.

29. A carriage for cameras or the like, comprising a pair of track members, and a supporting device for said track members which supporting device comprises a pair of brackets arranged one adjacent each end of said track members, said brackets each having leg portions for resting upon the floor or the like, and each bracket also having arm portions extending into positions beneath the track members, and resilient means extending between said arms and said track members for resiliently supporting the track members upon said arms.

30. A camera device comprising a carriage formed with spaced track members, a camera, a camera bed, wheels carried by said camera bed resting upon and movable along said track members, the camera and camera bed with said wheels being adapted to be lifted bodily from said track members when desired, and a supporting device for said carriage to which the carriage is resiliently connected.

In testimony whereof I affix my signature in the presence of two witnesses.

HARRY D. FARQUHAR.

Witnesses:
BERNARD GREENBAUN.
CELIA WEISS.